UNITED STATES PATENT OFFICE.

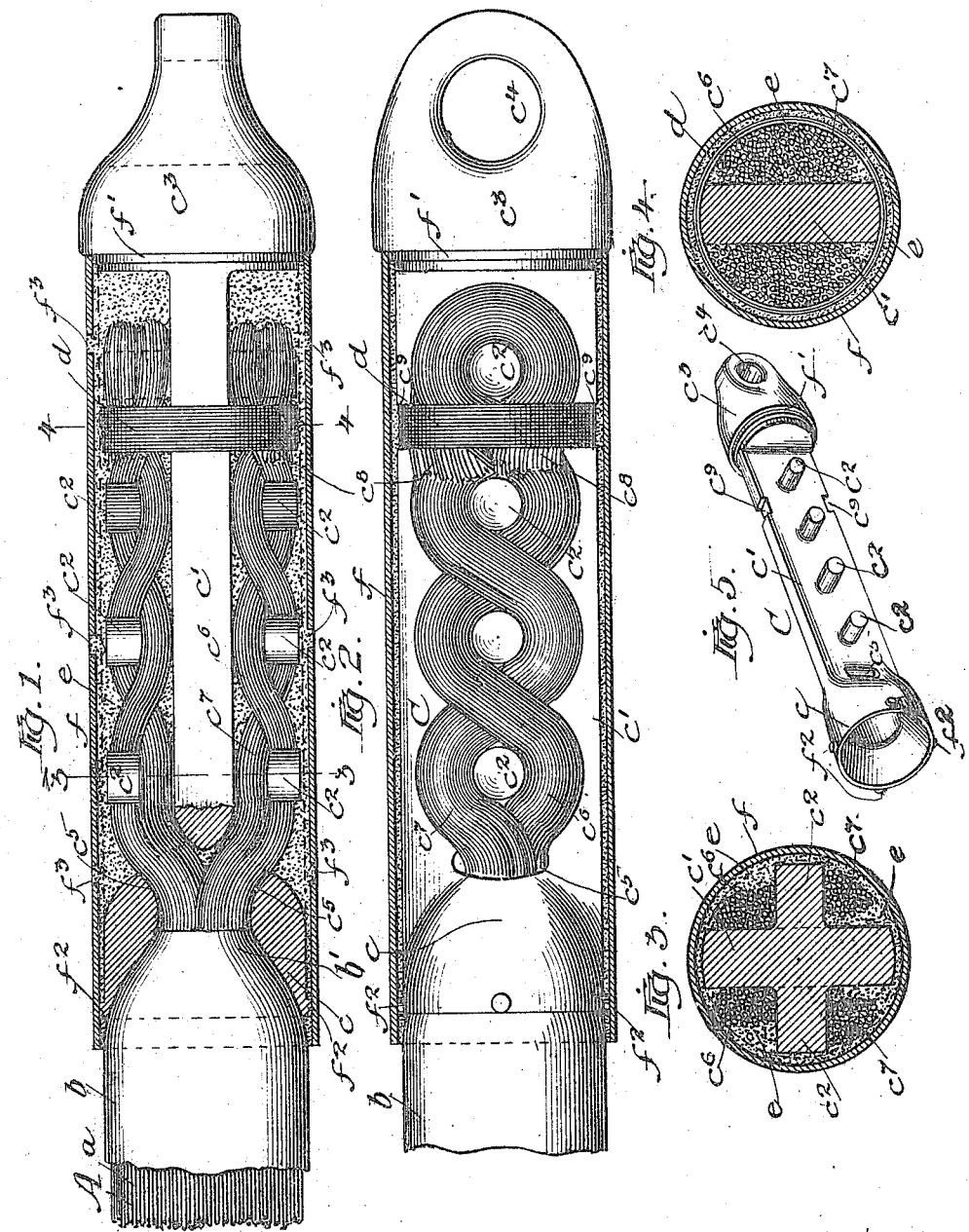
J. P. COLE.
DRAW COUPLING FOR WIRE CABLES.
APPLICATION FILED DEC. 12, 1913. RENEWED JULY 25, 1917.
1,257,981.
Patented Mar. 5, 1918.

JAMES P. COLE, OF GLENVIEW, ILLINOIS; AUGUSTINE J. COLE AND LOUIS S. COLE EXECUTORS OF SAID JAMES P. COLE, DECEASED.

DRAW-COUPLING FOR WIRE CABLES.

1,257,981.  Specification of Letters Patent.  Patented Mar. 5, 1918.

Application filed December 12, 1913, Serial No. 806,195. Renewed July 25, 1917. Serial No. 182,804.

*To all whom it may concern:*

Be it known that I, JAMES P. COLE, a resident of Glenview, in the county of Cook and State of Illinois, have invented certain new and useful Improvements in Draw-Couplings for Wire Cables, of which the following is a full, clear, and exact description.

The invention relates to draw-couplings for wire cables.

In installing armored conductor-cables in conduits, it is important that an effective connection should be made between a hauling line for drawing the cable through the conduit and the end of the conductor-cable, because any breaking of the connection entails loss of a great deal of time in withdrawing the conductor-cable from the conduit and again stringing the hauling line through the conduit. It is also important in installing armored conductor-cables that a suitable coupling be employed which will not strip the armor, which is usually made of soft metal, such as lead, from the end of the cable because sometimes the cable is permitted to remain for a considerable time in the intersecting vaults between the conduits, before the electrical connections are made, and at such times, it is necessary to protect the conductor-wires of the cable and the insulation thereon from the effect of moisture and water.

Heretofore, it has been customary to connect the hauling line by couplings extending around the armor of the cable which, in many cases, resulted in stripping the armor from the cable or in rupturing the armor and destroying its protectiveness. In some instances also, the connection between the hauling line and the armored cable was not efficiently made so that the connection would break off or slip from the cable, particularly at the time when the cable is subjected to the severe stresses as it approaches the exit-end of a conduit.

The present invention designs to overcome objections to the couplings heretofore employed and more particularly to provide an improved coupling in which a water-tight joint is provided which will effectively protect the conductors of the cable and the insulation around said conductors, and to provide a coupling in which an effective connection is made with the conductor wires at the end of the cable; also to provide an improved coupling in which connection is made with only a short length of the cable, so that the waste, resulting from mutilation of the cable-wires by the coupling will be comparatively small.

The invention further designs to provide an improved coupling in which the head to which the hauling cable is attached is enlarged to clear the conduit in advance of the armored cable to insure the removal of any obstruction in the conduit which might retard the passage of the cable through the conduit.

Other objects of the invention will be manifest from the improved coupling hereinafter set forth.

The invention consists in the several novel features hereinafter set forth and more particularly defined by claims at the conclusion hereof.

In the drawings: Figure 1 is a plan of a portion of an armored conductor-cable with the improved coupling connected thereto, parts being shown in section. Fig. 2 is a side elevation, parts being shown in section. Fig. 3 is a section taken on line 3—3 of Fig. 1. Fig. 4 is a section taken on line 4—4 of Fig. 1. Fig. 5 is a perspective of the draw-member which is provided with a clearing-head and a bar to which the conductor wires of the armored cable are laced.

A denotes a cable comprising conductor-wires $a$, which are separately covered with insulating material, and a protective sheath or armor $b$ which is usually formed of lead and incloses the cable. In attaching the cable to the coupling, a portion of the armor is cut off, as at $b'$, so as to leave short lengths of wire (in practice about one foot along) exposed for connection to the draw-coupling. Adjacent the point where the sheet or armor is cut, the cable and sheath are compressed.

The draw-member C comprises a socket portion $c$ which is adapted to receive the contracted terminal of the sheath $b$, a bar $c'$, provided with laterally projecting studs $c^2$ at the opposite sides thereof, and a head $c^3$ which is provided with an eye $c^4$ for connection to a draft-cable. Socket $c$, bar $c'$, studs $c^2$, and head $c^3$ are integrally formed and are usually made of cast steel or other material of great tensile strength. The socket $c$ is tapered to receive the contracted end of the sheath $b$ and terminates in two laterally extending openings $c^5$ through which the conductor-wires of the cable A are passed to the sides of the draw-bar $c'$. The projecting ends of the conductor-wires $a$ are divided in the tapered socket and approximately one half are threaded through the opening $c^5$ at one side of the socket and pass to one side of bar $c'$ and the other half are threaded through the opening $c^5$ at the other side of the socket and extend to the other side of said bar. The wires at each side of the draw-bar are again divided into series or groups $c^6$ and $c^7$ which are laced in opposite directions around the studs $c^2$, and the terminals $c^8$ of each group, after passing around the front stud $c^2$, are folded backwardly a sufficient distance so that they may be secured at the sides of the draw-bar by a wire $d$ which is wrapped around the ends of the wires at both sides of the draw-bar $c'$ and extends through notches $c^9$ in the draw-bar. The head $c^3$ of the draw-bar is tapered or pointed and is of size at least equal to the size of the cable, so that as it is pulled through a conduit, it will clear the conduit of any obstruction which might retard the passage of the coupling and cable therethrough. When the wires of cable A are laced around the studs on the draw-bar, the draw-coupling will be securely connected to the wires so that the pulling stresses will be exerted upon the wires of the cable instead of upon the sheath $b$. Resultantly, there will be no tendency to strip or mutilate the sheath.

In order to securely connect the wires to the coupling and to provide a water-tight connection around the end of the sheath so that moisture cannot get into the cable if it is left unconnected, particularly if the wires are left unconnected for a time in the vaults, solder $e$ is poured around the exposed ends of the wires and around the draw-bar and studs $c^2$. For this purpose, the coupling is usually placed in a sectional mold so that the solder will flow completely around the wires $a$ and the studs. The insulation around wires $a$ will be burnt off or otherwise removed from the ends of the wires outside of the sheath to cause the solder to unite with these wires which are usually made of copper and treated with a suitable flux to securely bond the wires to the solder. The cavity of the mold is usually of a diameter corresponding to the diameter of the socket $c$.

A sleeve $f$, which is formed of brass or other suitable material, is slipped backwardly over the sheath $b$ before the wires are connected to the draw-bar, is then pushed toward the head $c^3$ which is provided with a seat or shoulder $f'$ which positions the front end of the sleeve around the coupling. Studs $f^2$ are formed on the socket $c$ to position the inner end of the sleeve around said socket. This sleeve is provided with holes $f^3$. When the sleeve has been slipped into place, as shown in Fig. 1, solder is poured into it through the holes $f^3$ to fill the space between the molded solder and the sleeve and to fill the space between the sleeve and the socket $c$ and the space between a portion of the sheath $b$ adjacent the rear end of the socket. The inside of the sheath is tinned so that the solder will unite with the sleeve and secure the latter to the coupling.

When the connection has been thus completed, the coupling will be securely connected to the wires of the cable and an effective water-tight joint will be formed between the sleeve and the sheath. The hauling stresses will not be applied in any material degree to the sheath of the cable, but will be applied to the wires of the cable. In hauling the cable through a conduit, the head $c^3$ will clear the conduit, and the construction of the coupling is such that there will be no danger of breakage in hauling the cable through a long conduit. By lacing the wires to the draw-bar, only a short portion of the wires will be used in making the coupling.

When the cable has been drawn through a conduit, it will be sawed off at the inner end of sleeve $f$. By providing a coupling in which the wires are laced to the draw-bar, only a short portion of the wires are necessary to provide a secure connection and only short lengths of wires are wasted. By placing the sleeves and coupling with the ends of the wires in a retort, the solder will be melted and flow out of the holes $f^3$ and the end of the sleeve. The sleeve may then be separated from the coupling so that the wrapping wire and ends of the wires $a$ on the draw-bar may be cut away. The coupling and the sleeve may then be re-used.

The invention is not to be understood as restricted to the details set forth, since these may be modified within the scope of the appended claims without departing from the spirit and scope of the invention.

Having thus described the invention, what I claim as new and desire to secure by Letters Patent, is:

1. In a draw-coupling for cables, the combination of a draw-bar, oppositely disposed pins on said bar upon which to lace the divided wires of a cable, and means for securing the ends of said wire lacings to said bar.

2. In a draw-coupling for cables, the combination of a draw-bar, pins on the draw-bar for lacing the ends of the wires of a cable thereto, a sleeve inclosing the bar and the laced wire ends and fitted at its ends upon the ends of said bar, and a filling within the sleeve.

3. In a draw-coupling for cables, the combination of a draw-bar, pins on said bar upon which to lace the divided cable, and a socket at one end of the draw-bar to receive the end of the cable and to divide the wires thereof.

4. In a draw-coupling for cables, the combination of a draw-bar, means for securing the wires of a cable thereto, a socket at one end of the draw-bar for receiving the cable, a metallic sleeve around the bar and said socket and positioned by the ends of said bar, and a fusible filling in said sleeve.

5. In a draw-coupling for cables, a draw-bar having means for securing the wires of a cable thereto, and a clearing head of a diameter at least equal to that of the cable disposed at the front end of the draw-bar.

6. In a draw-coupling for cables, the combination of a draw-bar, a clearing head on the said bar, means for securing the wires of a cable to said bar, and a sleeve around the draw-bar fitting on said head and adapted to be slipped over the cable.

7. In a draw-coupling for cables, the combination of a draw-bar, means for securing the wires of a cable thereto, a clearing and securing head at the front end of said bar, a cable receiving socket at the rear end of said bar, and a sleeve around said bar and positioned at its ends by said clearing head and sleeve.

8. In a draw-coupling for cables, the combination of a draw-bar, means for securing the wires of a cable thereto, a clearing and securing head at the front end of said bar, a cable receiving socket at the rear end of said bar, a sleeve around said bar and positioned at its ends by said clearing head and sleeve, and a fusible filling in said sleeve.

9. In a draw-coupling for cables, a draw-bar having integral means thereon for lacing the divided wires of a cable thereto, an integral clearing head at one end, and a tapered socket at its other end for receiving the end of an armored cable and apertured on each side to divide the cable wires.

JAMES P. COLE.

Witnesses:
MILDRED STUMPF,
KATHARINE GERLACH.

Copies of this patent may be obtained for five cents each, by addressing the "Commissioner of Patents, Washington, D. C."